(12) United States Patent
Coggio et al.

(10) Patent No.: US 9,588,262 B2
(45) Date of Patent: Mar. 7, 2017

(54) OPTICALLY DIFFUSE LOW REFRACTIVE INDEX ELEMENT

(75) Inventors: William D. Coggio, Westford, MA (US); Michael L. Steiner, New Richmond, WI (US); William F. Edmonds, Minneapolis, MN (US); Robert F. Kamrath, Mahtomedi, MN (US); Lan H. Liu, Rosemount, MN (US); Encai Hao, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 517 days.

(21) Appl. No.: 13/879,839

(22) PCT Filed: Oct. 14, 2011

(86) PCT No.: PCT/US2011/056262
§ 371 (c)(1),
(2), (4) Date: Apr. 17, 2013

(87) PCT Pub. No.: WO2012/054320
PCT Pub. Date: Apr. 26, 2012

(65) Prior Publication Data
US 2013/0222911 A1   Aug. 29, 2013

Related U.S. Application Data

(60) Provisional application No. 61/394,991, filed on Oct. 20, 2010.

(51) Int. Cl.
*G02B 5/02* (2006.01)

(52) U.S. Cl.
CPC ............. *G02B 5/02* (2013.01); *G02B 5/0242* (2013.01); *G02B 5/0247* (2013.01); *G02B 2207/107* (2013.01)

(58) Field of Classification Search
CPC .. G02B 5/3025; G02B 5/0242; G02B 5/0226; G02B 5/0294; G02B 5/0278;
(Continued)

(56) References Cited

U.S. PATENT DOCUMENTS

| 5,264,275 A | 11/1993 | Misuda |
| 5,919,555 A | 7/1999 | Yasuda |

(Continued)

FOREIGN PATENT DOCUMENTS

| EP | 1167313 A1 | 1/2001 |
| JP | 1998130537 | 5/1998 |

(Continued)

OTHER PUBLICATIONS

Japanese Office Action for Application No. 2013-534966 dated Apr. 21, 2016, 2pgs.

(Continued)

*Primary Examiner* — Stephone B Allen
*Assistant Examiner* — Rahman Abdur
(74) *Attorney, Agent, or Firm* — Gregg H. Rosenblatt (57) ABSTRACT

An optical article includes an optical element and a low refractive index layer disposed on the optical element. The low refractive index layer having an effective refractive index of 1.3 or less and including a binder, a plurality of metal oxide particles dispersed in the binder and a plurality of interconnected voids. The low refractive index layer has a haze value of at least 30%.

19 Claims, 1 Drawing Sheet

(58) Field of Classification Search
CPC ...... G02B 5/02; G02B 6/0065; G02B 5/0247;
G02B 2207/107
USPC .......... 359/493.01, 577, 314.2, 314.4, 315.5,
359/316.6, 580, 582, 588, 304.4;
428/323, 325, 327, 304.4, 314.2, 315.5,
428/314.4, 316.6
See application file for complete search history.

(56) References Cited

U.S. PATENT DOCUMENTS

| | | | |
|---|---|---|---|
| 6,096,469 A | 8/2000 | Anderson | |
| 6,210,858 B1* | 4/2001 | Yasuda | B32B 7/02 |
| | | | 348/834 |
| 2004/0066556 A1 | 4/2004 | Dontula | |
| 2005/0106333 A1 | 5/2005 | Lehmann | |
| 2007/0231510 A1 | 10/2007 | Baker | |
| 2009/0213462 A1* | 8/2009 | Wakizaka | G02B 1/11 |
| | | | 359/580 |
| 2010/0208349 A1 | 8/2010 | Beer | |
| 2012/0038990 A1* | 2/2012 | Hao | G02B 5/0242 |
| | | | 359/599 |
| 2012/0039089 A1* | 2/2012 | Hao | G02B 5/02 |
| | | | 362/607 |
| 2013/0039094 A1 | 2/2013 | Kolb | |

FOREIGN PATENT DOCUMENTS

| | | |
|---|---|---|
| JP | 2001-278637 | 10/2001 |
| JP | 2003-119052 | 4/2003 |
| JP | 2006-003562 | 1/2006 |
| JP | 2006-171596 | 6/2006 |
| JP | 2010102072 | 6/2010 |

OTHER PUBLICATIONS

Japanese Office Action dated Aug. 20, 2015 in JP Application No. 2013-534966, 3pgs.
Paint Flow and Pigment Dispersion, Patton, T.C., $2^{nd}$ Edition, J. Wiley Interscience, 1978, Chapter 5, p. 126.
Modeling Cluster Voids and Pigment Distribution to Predict Properties and CPVC in Coatings. Part 1: Dry Coating Analysis and Sudduth, R. D. Pigment and Resin Technology, 2008, 37(6). p. 375.
Ridgeway, CJ, Transport in Porous Media, 2006, 63, p. 239.
Lee, H.K. et al, The Journal of Imaging Science and Technology, 2005, 49, p. 54.

* cited by examiner

OPTICALLY DIFFUSE LOW REFRACTIVE INDEX ELEMENT

BACKGROUND

Articles having a structure of nanometer sized pores or voids can be useful for several applications based on optical, physical, or mechanical properties provided by their nanovoided composition. For example, a nanovoided article includes a polymeric solid network or matrix that at least partially surrounds pores or voids. The pores or voids are often filled with gas such as air. The dimensions of the pores or voids in a nanovoided article can generally be described as having an average effective diameter that can range from about 1 nanometer to about 1000 nanometers. The International Union of Pure and Applied Chemistry (IUPAC) has defined three size categories of nanoporous materials: micropores with voids less than 2 nm, mesopores with voids between 2 nm and 50 nm, and macropores with voids greater than 50 nm. Each of the different size categories can provide unique properties to a nanovoided article.

Several techniques have been used to create porous or voided articles, including, for example polymerization-induced phase separation (PIPS), thermally-induced phase separation (TIPS), solvent-induced phase separation (SIPS), emulsion polymerization, and polymerization with foaming/blowing agents. Often, the porous or voided article produced by these methods requires a washing step to remove materials such as surfactants, oils, or chemical residues used to form the structure. The washing step can limit the size ranges and uniformity of the pores or voids produced. These techniques are also limited in the types of materials that can be used.

BRIEF SUMMARY

The present disclosure relates to low refractive index diffuser layers. In particular, the present disclosure relates to an optical article that includes an optical element and a low refractive index layer disposed on the optical article. The low refractive index layer has an effective refractive index of less than 1.3 and a haze value of at least 30%.

In one illustrative embodiment, an optical article includes an optical element and a low refractive index layer disposed on the optical element. The low refractive index layer having an effective refractive index of 1.3 or less and including a binder, a plurality of metal oxide particles dispersed in the binder and a plurality of interconnected voids. The low refractive index layer has a haze value of at least 30%.

In another illustrative embodiment an optical article includes a low haze optical low refractive index layer having an effective refractive index of 1.3 or less and a high haze low refractive index layer on the low haze optical low refractive index layer. The high haze low refractive index layer having an effective refractive index of 1.3 or less. The low haze low refractive index layer includes a binder, a plurality of metal oxide particles dispersed in the binder and a plurality of interconnected voids. The low haze low refractive index layer has a haze value of less than 30%. The high haze low refractive index layer includes a binder, a plurality of metal oxide particles dispersed in the binder, and a plurality of interconnected voids. The high haze low refractive index layer has a haze value of at least 30%.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

The present disclosure relates to low refractive index diffuser layers. In particular, the present disclosure relates to an optical article that includes an optical element and a low refractive index layer disposed on the optical article. The present disclosure describes intergrated optics in film format that can be useful for display applications. In particular, the present disclosure describes a low refractive index layer that is hazy and can function as a diffuser sheet. The present disclosure reduces the number of individual optical elements or films that are needed in a display application. The low refractive index layer has an effective refractive index of less than 1.3 and a haze value of at least 30%. The optical article provides an optically diffuse low index construction. While the present disclosure is not so limited, an appreciation of various aspects of the disclosure will be gained through a discussion of the examples provided below.

Some embodiments of the diffuser coatings, articles or constructions of the present disclosure include one or more low refractive index layers that include a plurality of voids dispersed in a binder. The voids have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of a low refractive index layer with light, such as light that is incident on, or propagates in, the low refractive index layer, depends on a number of film or layer characteristics such as, for example, the film or layer thickness, the binder index, the void or pore index, the pore shape and size, the spatial distribution of the pores, and the wavelength of light. In some embodiments, light that is incident on or propagates within the low refractive index layer "sees" or "experiences" an effective permittivity $\epsilon_{eff}$ and an effective index $n_{eff}$, where $n_{eff}$ can be expressed in terms of the void index $n_v$, the binder index $n_b$, and the void porosity or volume fraction "f." In such embodiments, the low refractive index layer is sufficiently thick and the voids are sufficiently small so that light cannot resolve the shape and features of a single or isolated void. In such embodiments, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. In some embodiments, some of the voids can be sufficiently small so that their primary optical effect is to reduce the effective index, while some other voids can reduce the effective index and scatter light, while still some other voids can be sufficiently large so that their primary optical effect is to scatter light.

In some embodiments, the light that is incident on the low refractive index layer is visible light, meaning that the wavelength of the light is in the visible range of the electromagnetic spectrum. In these embodiments, the visible light has a wavelength that is in a range of from about 380 nm to about 750 nm, or from about 400 nm to about 700 nm, or from about 420 nm to about 680 nm. In these embodiments, the low refractive index layer has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the low refractive index layer is sufficiently thick so that the low refractive index layer has an effective index that can be expressed in terms of the indices of refraction of the voids and the binder, and the void or pore volume fraction or porosity. In such embodiments, the thickness of the low refractive index layer is not less than about 1 micrometer, or not less than about 2 micrometers, or in a range from 1 to 20 micrometers.

When the voids in a disclosed low refractive index layer are sufficiently small and the low refractive index layer is sufficiently thick, the low refractive index layer has an effective permittivity $\epsilon_{eff}$ that can be expressed as:

$$\epsilon_{eff} = f\epsilon_v + (1-f)\epsilon_b \quad (1)$$

In these embodiments, the effective index $n_{eff}$ of the optical film or low refractive index layer can be expressed as:

$$n_{eff}^2 = fn_v^2 + (1-f)n_b^2 \quad (2)$$

In some embodiments, such as when the difference between the indices of refraction of the pores and the binder is sufficiently small, the effective index of the low refractive index layer can be approximated by the following expression:

$$n_{eff} = fn_v + (1-f)n_b \quad (3)$$

In these embodiments, the effective index of the low refractive index layer is the volume weighted average of the indices of refraction of the voids and the binder. Under ambient conditions, the voids contain air, and thus the refractive index $n_v$ for the voids is approximately 1.00. For example, a low refractive index layer that has a void volume fraction of about 50% and a binder that has an index of refraction of about 1.5 has an effective index of about 1.25.

In some embodiments, the effective index of refraction of the low refractive index layer is not greater than (or is less than) about 1.3, or less than about 1.25, or less than about 1.23, or less than about 1.2, or less than about 1.15. In some embodiments, the refractive index is between about 1.14 and about 1.30. In some embodiments, the low refractive index layer includes a binder, a plurality of particles, and a plurality of interconnected voids or a network of interconnected voids.

A plurality of interconnected voids or a network of interconnected voids can occur in a number of methods. In one process, the inherent porosity of highly structured, high surface area fumed metal oxides, such as fumed silica oxides, is exploited in a mixture of binder to form a composite structure that combines binder, particles, voids and optionally crosslinkers or other adjuvant materials. The desirable binder to particle ratio is dependent upon the type of process used to form the interconnected voided structure.

While a binder resin is not a prerequisite for the porous fumed silica structure to form, it is typically desirable to incorporate some type of polymeric resin or binder in with the metal oxide network to improve the processing, coating quality, adhesion and durability of the final construction. Examples of useful binder resins are those derived from thermosetting, thermoplastic and UV curable polymers. Examples include polyvinylalcohol, (PVA), polyvinylbutyral (PVB), polyvinyl pyrrolidone (PVP), polyethylene vinly acetate copolymers (EVA), cellulose acetate butyrate (CAB) polyurethanes (PURs), polymethylmethacrylate (PMMA), polyacrylates, epoxies, silicones and fluoropolymers. The binders could be soluble in an appropriate solvent such as water, ethyl acetate, acetone, 2-butone, and the like, or they could be used as dispersions or emulsions. Examples of some commercially available binders useful in the mixtures are those available from Kuraray-USA, Wacker Chemical, Dyneon LLC, and Rhom and Haas. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof. Some typical examples would be 1,6 hexane diol diacrylate, trimethylol propane triacrylate, pentaerythritol triacryalate. Such systems are readily available from suppliers such as Neo Res (Newark, Del.), Arkema (Philadelphia, Pa.), or Sartomer (Exton, Pa.). Actinic radiation such as electron beam (E-beam), gamma and UV radiation are useful methods to initiate the polymerization of these systems, with many embodiments utilizing UV active systems. Other useful binder systems can also be cationically polymerized, such systems are available as vinyl ethers and epoxides.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons such as to improve the cohesive strength of the coating, adhesion to the substrate or moisture, or thermal and solvent resistance. The specific type of crosslinker is dependent upon the binder used. Typical crosslinkers for polymeric binders such as PVA would be diisocyanates, titantates such as TYZOR-LA™ (available from DuPont, Wilmington, Del.), poly (epichlorhydrin)amide adducts such as PolyCup 172, (available from Hercules, Wilmington, Del.), multi-functional aziridines such as CX100 (available from Neo-Res, Newark, Del.) and boric acid, diepoxides, diacids and the like.

The polymeric binders may form a separate phase with the particle aggregates or may be inter-dispersed between the particle aggregates in a manner to "bind" the aggregates together into a structures that connect with the metal oxidize particles through direct covalent bond formation or molecular interactions such as ionic, dipole, van Der Waals forces, hydrogen bonding and physical entanglements with the metal oxides.

Exemplary particles include fumed metal oxides or pyrogenic metal oxides, such as, for example, a fumed silica or alumina In some embodiments, particles that are highly branched or structured may be used. Such particles prevent efficient packing in the binder matrix and allow interstitial voids or pores to form. Exemplary materials include highly branched or structured particles include Cabo-Sir fumed silicas or silica dispersions, such as, for example, those sold under trade designations TS 520, or pre-dispersed fumed silica particles such as those available as Cabo-Sperse™ PG 001, PG 002, 1020K, 1015 (available from Cabot Corporation). Fumed alumina oxides are also useful structured particles to form a low refractive index system although silica may be preferred since it has an inherently lower skeletal refractive index than alumina Examples of alumina oxide are available under the trade name Cabo-Sperse, such as, for example, those sold under the trade designation Carbo-Sperse™ PG003 or Cabot Spec-Al™. In some embodiments, aggregates of these exemplary fumed metal oxides include a plurality of primary particles in the range of about 8 nm to about 20 nm and form a highly branched structure with a wide distribution of sizes ranging from about 80 nm to greater than 300 nm. In some embodiments, these aggregates pack randomly in a unit volume of a coating to form a mesoporous structure with complex bi-continuous network of channels, tunnels, and pores which entrap air in the network and thus lower the density and refractive index of the coating. Other useful porous materials are derived from naturally occurring inorganic materials such as clays, barium sulfates, aluminum, silicates and the like. The low refractive index layer has an effective refractive index of 1.23 or less when the metal oxide is silica oxide and 1.33 or less then the metal oxide is alumina oxide.

Fumed silica particles can also be treated with a surface treatment agent. Surface treatment of the metal oxide particles can provide, for example, improved dispersion in the polymeric binder, altered surface properties, enhanced particle-binder interactions, and/or reactivity. In some embodiments, the surface treatment stabilizes the particles so that the particles are well dispersed in the binder, resulting in a substantially more homogeneous composition. The incorporation of surface modified inorganic particles can be tailored, for example, to enhance covalent bonding of the particles to the binder, thereby providing a more durable and more homogeneous polymer/particle network.

The preferred type of treatment agent is determined, in part, by the chemical nature of the metal oxide surface. Silanes are preferred for silica and other siliceous fillers. In the case of silanes, it may be preferred to react the silanes with the particle surface before incorporation into the binder. The required amount of surface modifier is dependent upon several factors such as, for example, particle size, particle type, modifier molecular weight, and/or modifier type. The silane modifier can have reactive groups that form covalent bonds between particles and the binder, such as, for example, carboxy, alcohol, isocynanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, Cabo-Sil™ TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl)methoxyethoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris (2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

Particle volume concentration (PVC) and critical particle volume concentration (CPVC) can be used to characterize the porosity of the particle binder system used to make the coating. The terms PVC and CPVC are well defined terms in the paint and pigment literature and are further defined in frequently referenced articles and technical books, such as, for example *Paint Flow and Pigment Dispersion*, Patton, T. C., $2^{nd}$ Edition, J. Wiley Intersceince, 1978, Chapter 5, p. 126 and *Modeling Cluster Voids and Pigment Distribution to Predict Properties and CPVC in Coatings. Part 1: Dry Coating Analysis* and Sudduth, R. D; *Pigment and Resin Technology*, 2008, 37(6). p. 375.

When the volume concentration of the particles is larger than the CPVC, the coating is porous since there is not enough binder to fill all the gaps between the particles and the interstitial regions of the coating. The coating then becomes a mixture of binder, particles, and voids. The volume concentration at which this occurs is related to particle size and particle structure, wetting and/or shape. Formulations with volume concentrations above the CPVC have a volume deficiency of resin in the mixture that is replaced by air. The relationship between CPVC, PVC and porosity is:

$$\text{Porosity} = 1 - \frac{CPVC}{PVC}$$

Materials that provide desired low refractive index properties have submicron pores derived from particle-binder mixtures that are highly structured and formulated above their CPVC. In some embodiments, optical articles have CPVC values that are not greater than (or are less than) about 60%, or less than about 50%, or less than about 40%.

As described above, particles that are highly branched or structured prevent efficient packing in the binder matrix and allow interstitial voids or pores to form. In contrast, material combinations which fall below the desired CPVC will not be sufficiently porous. The BET method may be helpful in determining CPVC and thus porosity of low index materials because the BET method analyzes pores that are less than 200 nm in diameter, less than 100 nm in diameter, or even less than 10 nm in diameter. As used herein, the term "BET method" refers to the Braunauer, Emmett, and Teller surface area analysis (See S. Brunauer, P. H. Emmett and E. Teller, *J. Am. Chem. Soc.,* 1938, 60, 309). The BET method is a well-known, scientifically validated method used to determine pore size, surface area, and percent porosity of a solid substance. BET theory relates to the physical adsorption of gas molecules on a solid surface and serves as the basis for obtaining physical information about the surface area and porosity of a solid surface. BET data can assist in the characterization of materials that meet minimum requirements for forming a porous structure.

The volume concentration of the particles described by the PVC/CPVC relationship is also related to the weight concentration of the particles. It is therefore possible to establish particle weight ranges that are above the CPVC. The use of weight ratio or weight percent is one way to formulate mixtures with the desirable CPVC values. For the optical constructions of the present disclosure, weight ratios of binder to particle from 1:1 to 1:10 are desirable. A weight ratio of 1:1 is the equivalent of about 50 wt % particle, where as 1:8 is equivalent to about 89 wt % particle. Exemplary binder to metal oxide particle ratios are less than 1:2 (less than 33% binder), less than 1:3, less than 1:4, less than 1:5, less than 1:6, less than 1:7, less than 1:8, less than 1:9, and less than 1:10 (about 8-10% binder). The upper limit of binder may be dictated by the desired refractive index. The lower limit of binder may be dictated by the desired physical properties, for example, processing or final durability characteristics. Thus the binder to particle ratio will vary depending on the desired end use and the desired optical article properties.

In general, the low refractive index layer can have any porosity, pore-size distribution, or void volume fraction that may be desirable in an application. In some embodiments, the volume fraction of the plurality of the voids in the low refractive index layer is not less than about 20%, or not less than about 30%, or not less than about 40%, or not less than about 50%, or not less than about 60%, or not less than about 70%, or not less than about 80%.

In some embodiments, portions of the low refractive index layer can manifest some low index properties, even if the low refractive index layer has a high optical haze and/or diffuse reflectance. For example, in such embodiments, the portions of the low refractive index layer can support optical gain at angles that correspond to an index that is smaller than the index $n_b$ of the binder.

In some embodiments, some of the particles have reactive groups and others do not have reactive groups. For example in some embodiments, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some embodiments, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

In some embodiments, the low refractive index layers or materials have a BET porosity that is greater than about 30% (which corresponds to a surface area of about 50 m$^2$/g as determined by the BET method), porosity greater than about 50% (which corresponds to a surface area of about 65-70 m$^2$/g as determined by the BET method), greater than about 60% (which corresponds to a surface area of about 80-90 m$^2$/g as determined by the BET method), and most preferably between about 65% and about 80% (which corresponds to a somewhat higher surface area of values greater than about 100 m$^2$/g as determined by the BET method). In some embodiments, the volume fraction of the plurality of interconnected voids in the low refractive index layer is not less than (or is greater than) about 20%, or greater than about 30%, or greater than about 40%, or greater than about 50%, or greater than about 60%, or greater than about 70%, or greater than about 90%. Generally it can be shown higher surface areas indicated higher percent porosity and thus lower refractive index; however the relationship between these parameters is complicated. The values shown here are only for purposes of guidance and not meant to exemplify a limiting correlation between these properties. The BET surface area and percent porosity values will be dictated by the need to balance the low refractive index and other critical performance properties such as cohesive strength of the coating.

The optical constructions of the present disclosure can have any desired optical haze. In some embodiments, low refractive index layer has an optical haze that is not less than (or is greater than) about 20%, or greater than about 30%, or greater than about 40%, or greater than about 50%, or greater than about 60%, or greater than about 70%, or greater than about 80%, or greater than about 90%, or greater than about 95%. In some embodiments, the low index refractive layer has a low optical haze. The low index refractive layer low optical haze layer can be an additional layer to the optical construction described herein. For example, in some embodiments, the optical haze of the low haze, low index refractive layer is less than about 20%, less than about 7%, less than about 5%, less than about 3%, less than about 2%, less than about 1.5%, or less than about 1%.

The optical constructions of the present disclosure can have any desired optical clarity. In some embodiments, low refractive index layer has an optical clarity that is less than about 25%, or less than about 20%, or less than about 15%, or less than about 10%.

In some embodiments, portions of neighboring major surfaces of each two neighboring layers in optical construction are in physical contact with each other. For example, portions of neighboring major surfaces of respective neighboring layers in optical construction are in physical contact with each other. For example, at least 30%, or at least 40%, or at least 50%, or at least 60%, or at least 70%, or at least 80%, or at least 90%, or at least 95% of the two neighboring major surfaces are in physical contact with each other.

In some embodiments, portions of neighboring major surfaces (major surfaces that face each other or are adjacent to each other) of each two neighboring layers in optical construction are in physical contact with each other. For example, in some embodiments, there may be one or more additional layers, not expressly shown in the figures, disposed between the low refractive index layer and optical elements. In such embodiments, substantial portions of neighboring major surfaces of each two neighboring layers in optical constructions are in physical contact with each other. In such embodiments, at least 30%, or at least 40%, or at least 50%, or at least 60%, or at least 70%, or at least 80%, or at least 90%, or at least 95% of the neighboring major surfaces of each two neighboring layers in the optical construction are in physical contact with each other.

There are numerous coating techniques known in the art useful to make the embodiments described herein. The more common techniques are, but not limited to, well known roll-to-roll automated processes such as knife bar, slot die, slide, curtain, roll and Grauvre coating techniques. It is also possible to coat these solutions using non-continuous methods such as inkjet, screen, offset printing, dip and spray coating techniques. While the exact coating technique is not critical to obtain the low refractive index properties some techniques enable multiple layers to be coated onto the substrate simultaneously, which can improve the economics of the coating process. The desired final application will dictate which technique is preferred.

Figure 1:
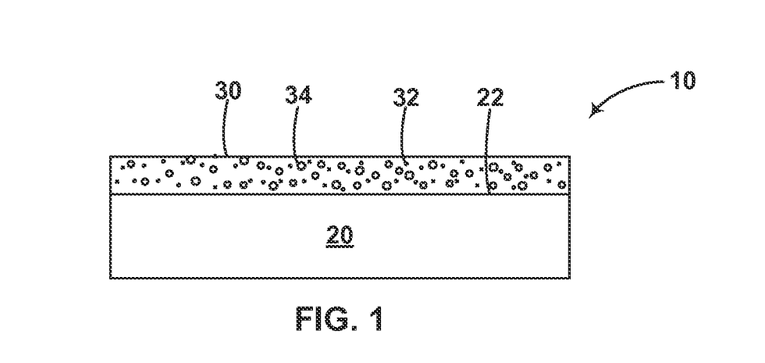
FIG. 1 is a schematic diagram side elevation view of an illustrative optical article.

FIG. 1 is a schematic diagram side elevation view of an illustrative optical article 10. The optical article 10 includes an optical element 20 and a low refractive index layer 30 disposed on a surface 22 of the optical element 20. The low refractive index layer 30 is described above and has an effective refractive index of 1.3 or less. The low refractive index layer 30 includes a binder, a plurality of metal oxide particles 32 dispersed in the binder, and a plurality of interconnected voids 34, the low refractive index layer having a haze value of at least 30%. This optical article 10 provides a unique set of optical properties, that is, low index and high haze, as described above.

In some embodiments, the optical article 10 includes a low refractive index layer 30 (for example, an effective refractive index of 1.3 or less or 1.23 or less) has a haze value of at least 50%, or at least 90% and a clarity value of less than 20%. The low refractive index layer 30 can have any useful thickness. In many embodiments, the low refractive index layer 30 has a thickness in a range from 1 to 20 micrometers.

Figure 2:
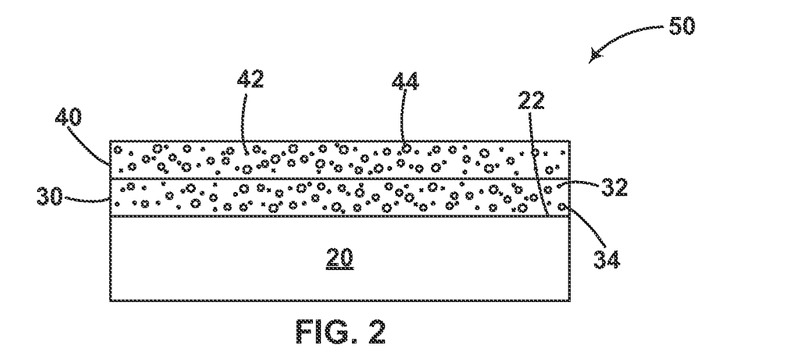
FIG. 2 is a schematic diagram side elevation view of another illustrative optical article.
Figure 3:
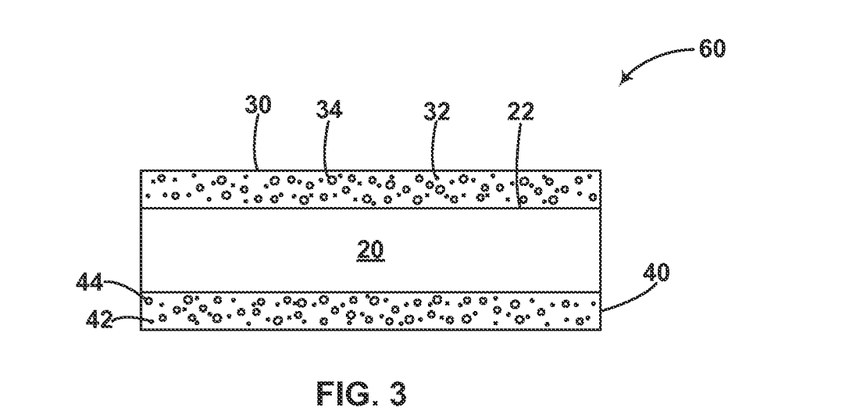
FIG. 3 is a schematic diagram side elevation view of another illustrative optical article.

FIG. 2 is a schematic diagram side elevation view of another illustrative optical article 50 where the low refractive index layers 30, 40 are stacked on an optical element 20 having a surface 22. The low haze low refractive index layer 40 includes a binder, a plurality of metal oxide particles 42 dispersed in the binder and a plurality of interconnected voids 44. The high haze low refractive index layer 30 includes a binder, a plurality of metal oxide particles 32 dispersed in the binder, and a plurality of interconnected voids 34. FIG. 3 is a schematic diagram side elevation view of another illustrative optical article 60 where the optical element 20 has a surface 22 and separates the low refractive index layers 30, 40. The optical article 50, 60 includes a low haze optical low refractive index layer 40 that has an effective refractive index of 1.3 or less and a high haze low refractive index layer 30 on the low haze optical low refractive index layer 40. In some embodiments, the low haze optical low refractive index layer 40 is a similar to the high haze low refractive index layer 30 and has a haze value of 30% or greater. The high haze low refractive index layer 30 has an effective refractive index of 1.3 or less. The low haze low refractive index layer 40 includes a binder, a plurality of metal oxide particles 42 dispersed in the binder and a plurality of interconnected voids 44. The low haze low refractive index layer 40 has a haze value of less than 30%. The high haze low refractive index layer 30 includes a binder, a plurality of metal oxide particles 32 dispersed in the binder, and a plurality of interconnected voids 34. The high haze low refractive index layer 30 has a haze value of at least 30%.

In some embodiments, the optical article 50, 60 has a haze value of at least 50%, or at least 90% and a clarity value of less than 20%. The high haze low refractive index layer 30 and the low haze optical low refractive index layer 40 each have an effective refractive index of 1.3 or less or 1.23 or less. The high haze low refractive index layer 30 and the low haze optical low refractive index layer 40 can have any useful thickness. In many embodiments, the high haze low refractive index layer 30 and/or the low haze optical low refractive index layer 40 has a thickness in a range from 1 to 20 micrometers.

In some embodiments, the high haze low refractive index layer 30 can have a haze value of 90% or greater and the low haze optical low refractive index layer 40 can have a haze value of 10% or less.

The optical element 20 can be any useful optical element. In many embodiments the optical element 20 is a polarizing film, a diffusing film, a partially reflective film, a retarder, a light guide or a liquid crystal display panel. In some embodiments the optical element 20 is a visible light transparent or transmissive substrate. The optical element 20 is illustrated adjacent to the high haze low refractive index layer 30, however in some embodiments, the optical element 20 separates the high haze low refractive index layer 30 from the low haze optical low refractive index layer 40 or the optical element 20 is adjacent to the low haze low refractive index layer 40.

In some embodiments, the optical element 20 can be an absorbing polarizer or a reflective polarizer. Reflective polarizers include fiber, multilayer, cholesteric, and wire grid reflective polarizers, for example. Multilayer reflective polarizers include Brightness Enhancement Film (BEF) and Dual Brightness Enhancement Film (DBEF) both commercially available from 3M Company, St. Paul, Minn. In some embodiments, the optical element 20 can be a light redirecting film and being diffractive and/or refractive. In some embodiments, the optical element 20 can be a graphic film, triacetate cellulose, or an optical adhesive.

EXAMPLES

Examples with Hand-Spreads:
Preparation of Coating Solutions CE-1A, CE-1B and CE-1C The comparative example coating solutions CE-1A, CE-1B and CE-1C were prepared using mixtures of polyvinyl alcohol (PVA) with the fumed silica oxides Cab-O-Sperse™ PG022 (available from Cabot Corp., Billerica Mass.). Cab-O-Sperse™ PG022 is an acid stabilized surface modified silica dispersion based on Cab-O-Sil™, M5 silica. The PVA resin, Poval™ PVA 235, is an 88% hydrolyzed polyvinyl alcohol available (available from Kuraray-USA, Houston Tex.). In a typical procedure 100 g of Cab-O-Sperse™ PG 022 dispersion (20 wt % solids) was added to a 400 ml plastic beaker equipped with an air driven laboratory mixer and a heating mantle. The silica dispersion was gently agitated and warmed to 45-50 degrees C. When the dispersion had equilibrated in this temperature range, 14 g of a pre-warmed 5 wt % aqueous boric acid solution (available from Aldrich Chemical Company, Milwaukee Wis.), corresponding to 0.7 g boric acid or 0.035 g boric acid/g silica) was added to the silica dispersion and was mixed for about 30 minutes. After this time, 2 g of a low foaming surfactant (10 wt % Tergitol™ Min-Foam 1× in water) was added to the silica-boric acid mixture followed by the addition of 3.36 g of polyvinyl alcohol (PVA). Tergitol™ is a non-ionic surfactant available from Dow Chemicals of Midland, Mich. The PVA was added as 46.3 g of an aqueous 7.2 wt % solution. Upon addition of the PVA, the mixture became very viscous and an additional 87 g of deionized (DI) water added to reduce the viscosity and ensure adequate mixing. The mixture was agitated under mild conditions for an additional 20 minutes. Then the coating solution was transferred to a 1 L, 1-neck round bottom flask and placed on a rotary evaporator system (available as a Rotovap™ from Buchi GmbH Flawil Switzerland.) at 40° C. and 600 mmHg vacuum to degas the mixture. After the mixture was degassed, the solids were checked and the mixture was found to contain 10.2% solids. The final mixture comprised on a dry weight basis 1 part PVA resin to 6 parts silica (1:6 PVA-Si ratio, 14.3% PVA by weight). The coating mixture was used as CE-1A. Comparative Example coating solutions CE-1B and CE-1C were prepared in a similar manner except the resin to silica ratio were adjusted to 1:4 (20 wt % PVA) and 1:3 (25 wt % PVA) respectively.

Preparation of Coating Solutions 1A, 1B and 1C

Coating solution 1A was prepared from mixtures of PVA-235 and the fumed silica oxide dispersion Cab-O-Sperse™ PG002 (also available from Cabot Corp.). This is a non-surface modified, alkaline stabilized dispersion of MH-5 silica. In a typical process, 138.8 g of 7.2 wt % PVA 235 solution was charged to 800 ml plastic beaker (10.0 g PVA 235 on a dry weight basis) followed by the addition of 2.0 g of 10 wt % Tergitol Min-Foam 1× and 1 ml of concentrated $NH_4OH$ solution. These components were mixed thoroughly with a stirring rod. After these components were mixed completely, 300 g of Cab-O-Sperse™ PG002, 20 wt % in water was added followed by the addition of 260 g of DI water. The components were thoroughly mixed and were transferred to a 1 L, 1-neck round bottom flask and placed on a Rotovap at 40° C. and 600 mm Hg vacuum to degas the mixture. The final solids were adjusted to 10% wt. The final mixture on a dry weight basis was composed of 1 part PVA resin to 6 parts silica (1:6 PVA-Si ratio, 14.3% PVA by weight). Coating solutions 1B and 1C were prepared in a similar manner, except the resin to silica ratios were adjusted to 1:4 (20 wt % PVA) and 1:3 (25 wt % PVA) respectively. The weight percent solids were likewise adjusted to about 10%.

Preparation of Coating Solutions 2A, 2B and 2C

Coating solutions 2A, 2B and 2C were prepared in a similar manner to coating solutions 1A, 1B and 1C except the dispersion used was Cab-O-Sperse™ 1015A (also available from Cabot Corp.).

Preparation of Coating Solutions 3A, 3B and 3C

Coating solutions 3A, 3B and 3C were prepared in a similar manner to coating solutions 2A, 2B and 2C, except the dispersion was Cab O-Sperse™ 1020K (also available from Cabot Corp.). This is the same particle aggregate as 1015A, except the dispersion is alkaline and is stabilized with potassium. Final target coating solids in all cases were 10 wt %.

Preparation of Coating Solutions 4A and 4B

First, surface modified silica particles with 50% A174 and 50% isooctyltrimethoxy silane were prepared as follows. A 1000 ml 3-neck flask equipped with a stir bar, stir plate, condenser, heating mantle and temperature controller was charged with 400 grams of Cab-O-Sperse PG002 (Cabot Corporation, Boston, Mass.) 20 wt % solids fumed silica dispersion. To this dispersion 50 grams of Isopropanol was added with mixing. Next a premix of 6.15 grams of 3-Methacryloxypropyltrimethoxysilane A174 (available as Stock #A17714 from Alfa Aesar, Ward Hill, Mass.), 5.80 grams of isooctyltrimethoxysilane (available as Stock #SII6458.0 from Gelest, Inc., Morrisville, Pa.) and 50 grams of isopropanol was added with mixing. The premix beaker was rinsed with aliquots of isopropanol totaling 50 grams. The rinses were added to the batch. The resultant mixture was a hazy, translucent dispersion. The batch was heated to 50 degrees C. and held for approximately thirty minutes. After thirty minutes at 50 degrees C. the mixture was a homogeneous, opaque white dispersion. At this point, 250 grams of isopropanol was added to the batch. The batch was heated to reflux (~80 deg C.) and held with mixing. After approximately thirty minutes the batch became very viscous. An additional 200 grams of isopropanol was added. The batch became much less viscous. The batch was held at reflux for a total of six hours. After six hours at reflux, the batch was allowed to cool to room temperature with mixing. At this point the batch was a thick, off-white slurry with some dried solids on the walls of the reaction flask. The resultant reaction mixture was solvent exchanged into 1-methoxy-2-propanol by alternate vacuum distillation and addition of 1200 grams of 1-methoxy-2-propanol. The batch was concentrated further by vacuum distillation. The final mixture was a high viscosity, translucent dispersion with 15.4 wt % solids.

Coating solution 4A was prepared at a 1-6 resin to silica wt ratio using the surface modified PG 002 silica described above and the UV curable urethane acrylate oligomer CN 9013, available from Sartomer USA of Exton, Pa. In an appropriately sized mix vessel, 50 g of modified PG 002 concentrated by vacuum distillation to result in a very viscosity, opaque dispersion with 31.1 wt % solids.

Coating solution 5 was made by dissolving 3.0 g of CN9893 (available from Sartomer, Exton, Pa.) in 7 g of ethyl acetate under ultrasonic treatment first, then 38.6 g of A-174 modified Cab-O-Sperse™ 1020K as prepared above, and 0.23 g of Irgacure 184 were mixed together to form a homogenous coating solution with a resin to silica ratio of 1:4 by weight.

Preparation of coating solutions 6A, 6B and 6C were prepared in a similar manner to coating solutions 3A, 3B and 3C, except the dispersion was Cab-O-Sperse™ fumed $Al_2O_3$. Coating solution 6A was prepared with a PVA-Al ratio of 1-6 and coating solutions 6B and 6C were prepared with PVA-Al of 1-4 and 1-8 respectively. Final target coating solids in all cases were 10 wt %.

Table 1 summarizes coating components for the coating solutions described above.

TABLE #1

| | Particle Description for coating formulations: | | | | | |
|---|---|---|---|---|---|---|
| Formulations | Si Dispersions | Relative Primary Particle Size | Aggregate Size (nm) | pH Range | Stabilized | Surface Area (m2/g) |
| CE-1A-, CE-1B, CE-1C | PG022 | Small | ~150 | 4.5 | Surface modified | 175-225 |
| 1A, 1B, 1C | PG002 | Medium | 140-160 | 9.5 | Potassium | 200 |
| 2A, 2B, 2C | 1015A | Large | >200 | 4.5 | Ammonia | 100-120 |
| 3A, 3B, 3C | 1020K | Large | >200 | 9.5 | Potassium | 100-120 |
| 4A, 4B | A174 surface modified PG002 | Medium | 140-160 | 9.5 | Organic surface modified | 200 |
| 5 | A174 surface modified 1020K | Medium | >200 | 9.5 | Organic surface modified | 100-120 |
| 6 | Al2O3 | Large | 90 | 4.5 | | |

(15.4% solids, 7.7 g solids) was mixed with 1.28 g of CN 9013. 0.18 g of the photo initiator Irgacure 184 (available from Ciba Specialty Chemicals, Terrytown N.Y.) was added and the final mixture was diluted with an additional 12.5 g of 2-butanone to yield a final coating solution of 14.4% solids. Coating solution 4B was prepared in a similar manner but at a resin to silica ratio of 1:3.

Preparation of Coating Solution 5.

First, surface modified fumed silica particles based on A-174 modified Cab-O-Sperse™ 1020K were prepared as follows. A 3000 ml 3-neck flask equipped with a stir bar, stir plate, condenser, heating mantle and thermocouple/temperature controller was charged with 1000 g of Cab-O-Sperse 1020K (a 20 wt % solids dispersion of fumed silica available from Cabot Corp.). To this dispersion, 1400 g of 1-methoxy-2-propanol was added with stirring. Next 30.75 g of 97% 3-(Methacryloxypropyl)trimethoxysilane (A-174, available from Alfa Aesar, Ward Hill, Mass.) was added to a 100 g poly beaker. The 3-(Methacryloxypropyl)trimethoxysilane was added to the batch with stirring. The beaker containing the 3-(Methacryloxypropyl)trimethoxysilane was rinsed with aliquots of 1-methoxy-2-propanol totaling 100 grams. The rinses were added to the batch. At this point the batch was an opaque white, viscous dispersion. The batch was heated to 80 deg C. and held for approximately 16 hours. The resulting mixture was viscous, opaque white slurry. The batch was cooled to room temperature. The water was removed from the batch by alternate vacuum distillation and addition of 900 g 1-methoxy-2-propanol. The batch was Coating Process for Hand-Spreads:

Coating Process:

All coatings were prepared using 50 micron (2 mil) 689 primed PET film (available from Dupont-Teijin Films USA, Chester Va.). Small laboratory scale hand spread coatings of good optical quality were prepared by coating the low index coating solution on primed polyester film. The film was held flat by use of a level 14×11 in. (35.6 cm by 27.9 cm) vacuum table model 4900 available from Elcometer Inc. of Rochester Hills, Mich. The coating solution was spread evenly on PET using a wire round coating rods (Meyer rods) available from RD Specialties of Webster NY or by use of a knife bar available from Elcometer Inc (Rochester Hills, Mich.). In a typical procedure, a standard sheet of white paper (8.5×11 in) was placed between the vacuum table and optical film to prevent coating defects associated with the vacuum table. All coatings were made using a degassed solution to avoid optical defects such as air bubble and surface cracks. A 5-8 ml sample of the coating solution was placed near the top of the film and the coating was made using either a number 45 or 30 Meyer Rod which provided a coating with a nominal wet thickness of 114-76.2 um (4.5 or 3.0 mils) respectively. When a knife bar coater was used, a 50.8-101.6 um (2 to 4 mil) knife bar gap provided a coating with a nominal wet thickness of 25.4 and 50.8 um (1 to 2 mils) respectively. The wet coatings were allowed to air dry at room temp for about 2-3 minutes and were then carefully transferred to a flat glass plate and placed in a forced air oven at 50° C. to dry completely. The coatings were covered with an appropriately sized aluminum pan to reduce drying patterns on the film due to air movement in the oven.

The process was modified for coated articles based on samples 4A, 4B and 5. After coating, samples 4A and 4B samples were dried briefly at room temperature followed by complete drying at 100 C for 2 min. The coatings were then cured using 500 W Fusion Systems Light Hammer UV chamber flushed with dry N2 at a line speed of 20 fpm. The coating was exposed to H-bulb high intensity radiation.

The coating solution 5 prepared above was coated on a primed 2 micron PET film obtained from DuPont under the trade designation "Melinex 617" using a #26 wire-wound rod (obtained from RD Specialties, Webster, N.Y.), respectively. The resulting film was dried in an oven at 85° C. for 2 min, then cured using a Fusion UV-Systems Inc. Light-Hammer 6 UV (Gaithersburg, Md.) processor equipped with an H-bulb, operating under nitrogen atmosphere at 100% lamp power at a line speed of 30 feet/min.

Table 2 shows measured properties of the hand-spread films. These include BET surface area, particle volume concentration (PVC), pore fraction, refractive index (RI), transmission (T), haze (H) and clarity (C). Surface area values were determined as follows using the Brunauer-Emmett-Teller (BET) method. Samples were prepared by drying down approximately 120 g of the corresponding coating solution using the rotary evaporation apparatus described previously. Samples were heated to between 45-55° C. at approximately 120-150 rpm to ensure the components stayed well mixed. Essentially all the water (>90%) was removed by this process and until the coating mixture became near power-like in its consistency. At this point the sample was removed from the rotary evaporator and transferred to a 200 ml drying dish cover with a sheet of foil, and dried completely at 75-90° C. for at least an additional 24 hrs. The fully dried mixture was powderized further using a standard laboratory mortar and pestle to form a free flowing powder. The dried mixtures were than subjected to BET analysis.

Density values needed to determine the BET data were measured using a 10 cc cup in a Micromeritics Accupyc 1340 helium gas pycnometer (Available from Micromeritics Instrument Corp., Norcross, Ga.). The surface area, pore volume and pore diameters were obtained using a 75 point analysis of partial pressures from $10^{-5}$-1.0 and back to 0.05. The results were produced using a 6 mm stem large bulb sample cell on a Quantachrome Autosorb-1 analyzer available from Giangarlo Scientific Inc., Pittsburgh, Pa. The samples were dried for at least 2 hours at 80° C. under a nitrogen gas purge. The surface area and porosity were obtained directly form the instrument using the non-linear density field theory method (NLDFT method). The Particle Volume Concentration (PVC) was calculated using skeletal density values for silica and polyvinyl alcohol of 2.2 g/ml and 1.26 g/ml respectively.

Refractive index (RI) values were determined by use of the prism coupling method using the Metricon 2010M Prism Coupler available from Metricon Corp. of Pennington, N.J. The RI (n) was determined at 633 nm. Accurate determination of the refractive index of the higher haze coatings was best determined by measuring the refractive index in the TM polarization state through the PET side of the coated film. In this process, the prism and the PET side of the coatings were coupled and the RI measurement was scanned between n=1.55 to 1.05. This method results in the detection of two critical angle transitions; one associated with the PET-prism interface at n=~1.495 and another associated with the PET-low index coating interface. The Metricon raw data were analyzed to determine the critical angle of this second transition by use of a 200 point smoothing analysis program of the regions above and below the inflection point of this second critical angle. Two linear regions were determined from the smoothed data and the intersection of these two lines corresponded to the inflection point of the curve and thus the RI of low refractive index coating.

Transmission, haze and clarity values were determined using a BYK-Gardner Haze Gard Plus (available from BYK-Gardner USA of Columbia, Md.). The reported values represent the average of at least 3 measurements taken from different regions of the coated film. The clarity value calculation uses the ratio (T2−T1)/(T1+T2), where T1 is the transmitted light that deviates from the normal direction between 1.6 and 2 degrees, and T2 is the transmitted light that lies between zero and 0.7 degrees from the normal direction.

TABLE 2

| Sample # | Binder-Particle Ratio (Wt %) | Particle Type | BET Surface area (m2/g) | PVC | % Porosity | RI | % T | % H | % C |
|---|---|---|---|---|---|---|---|---|---|
| CE 1A | 1-6 | PG-022 | 115 | 0.77 | 65% | 1.15 | 92 | 3 | 100 |
| CE 1B | 1-4 | | 99 | 0.70 | 60% | 1.16 | 91 | 7 | 99 |
| CE 1C | 1-3 | | | | | 1.18 | 90 | 10 | 98 |
| 1A | 1-6 | PG002 | 124 | 0.78 | 65% | 1.145 | 89 | 63 | 65 |
| 1B | 1-4 | | 108 | 0.70 | 59% | 1.163 | 87 | 88 | 68 |
| 1C | 1-3 | | 105 | 0.63 | 58% | 1.175 | 80 | 86 | 72 |
| 2A | 1-6 | 1015-A | (a) | | | 1.161 | 74 | 79 | 37 |
| 2B | 1-4 | | | | | 1.176 | 67 | 91 | 46 |
| 2C | 1-3 | | | | | 1.196 | 61 | 97 | 39 |
| 3A | 1-6 | 1020-K | 48 | 0.77 | 41% | 1.176 | 64 | 100 | 2 |
| 3B | 1-4 | | 46 | 0.70 | 41% | 1.191 | 55 | 100 | 8 |
| 3C | 1-3 | | 49 | 0.63 | 38% | 1.209 | 47 | 100 | 12 |
| 4A | 1-6 | A174 Modified PG002 | (a) | | | 1.168 | 91.3 | 29.3 | 88 |
| 4B | 1-3 | A174 Modified PG002 | (a) | | | 1.204 | 82.8 | 46.5 | 78 |
| 5 (b) | 1-4 | A174 Modified 1020K | (a) | | | 1.236 | 71 | 77 | 66 |

TABLE 2-continued

| Sample # | Binder-Particle Ratio (Wt %) | Particle Type | BET Surface area (m2/g) | PVC | % Porosity | RI | % T | % H | % C |
|---|---|---|---|---|---|---|---|---|---|
| 6A | 1-6 | PG-003 Al2O3 | 36 | 0.69 | 49% | 1.273 | 81 | 40 | 100 |
| 6B | 1-4 | | 24 | 0.60 | 38% | 1.282 | 79 | 39 | 100 |
| 6C | 1-8 | | 40 | 0.75 | 53% | 1.257 | 85 | 22 | 100 |

(a) BET measurement not conducted on silica monomer mixtures.
(b) coated at a wet coating weight of 2.6 mil (#26 Meyer Rod)
The data in Table 2 show that a wide range of low refractive index coatings can be obtained by using difference material combinations and formulation ratios to create low refractive index coatings with a wide range of haze and clarity values.

Optical Gain Characterization of Hand-Spread Films:

The optical gain of these coatings were determined by measuring the effective transmission (ET). This method provides an indication of how much light is directed towards a viewer and thus indicates how bright of an image could be viewed. The data in Table 3, shows that the coatings 3A, 3B and 3C have a gain greater than 140% when the coated article is adhered to a polarizer. An uncoated control is designed to have 100% gain.

TABLE 3

| Sample | PVA-Si Ratio | Measured ET | Normalized ET | Gain |
|---|---|---|---|---|
| 3A + Polarizer | 1-6 | 1.325 | 1.33 | 150% |
| 3A-control | | 0.843 | 0.896 | |
| 3B + Polarizer | 1-4 | 1.238 | 1.259 | 148% |
| 3B-control | | 0.796 | 0.850 | |
| 3C + Polarizer | 1-3 | 1.146 | 1.173 | 142% |
| 3CA-control | | 0.769 | 0.825 | |

The data in Table #3 show the high haze low index coating exhibit high normalized effective transmission (ET) and gain due to the low refractive index nature of the coating (in a single layer).

Examples with Automated Coating:

Coating Process for Automated Coating:

Coatings prepared using an automated process were produced using knife over roll coating. The knife was 41.9 cm (16.5 in) and the coating solution was supplied to the coating reservoir via a peristaltic pump. All coating solutions were degassed and passed through an in-line 20 micron Alpha™ Polypropylene Microfiber capsule filter (available from Meisner Filtration Products Camarillo, Calif.). For coating solution CE-1 based on boric acid/PG022 coating solutions, the knife, back-up roll, and coating solution were all heated to 38-42° C. (100.4 to 107.6° F.) to prevent solution gelling. Coating solutions based on 1020K, PG002 and 1025A could be coated satisfactorily at room temperature 22° C. (72° F.). The knife coating gap ranged from 50 to 125 microns depending upon desired coating thickness. All coatings were applied onto 50 micron primed PET film (DuPont—Teijin 689 film) at 4.57 m/min (15 fpm). Films were dried in a two zone convection oven with the first zone set at 46.1° C. (115° F.) and the second at 79.4° C. (175° F.).

Preparation of Coatings Used for Optical Film Constructions Examples A and B

A low refractive index coating solution essentially the same as composition 3B (Table 2, 3B, 1-4 PVA-Si, w/1020 k fumed Si) was prepared for a larger scale automated machine coating process. These wider coatings were prepared on PET Film using a knife coater. The coating solution was delivered by a continuous metering system on a slot fed knife design. The coating solution was filtered through a 30 micron Meisner filter system at room temperature. The coating width of 45.7 cm (18 in) using a 133 micron (5.25 mil) bar gap. The 10 wt % solution was coated at a rate of 4.57 m/min (15 fpm) to produce a dried coating thickness of 16 um (0.63 mil). The RI was determined to be 1.184 and transmission, haze and clarity values were determined to be 50%, 100% and 16% respectively.

Preparation of coatings used for Comparative Optical Film Constructions Examples C and D These comparative examples were prepared in a manner similar to Examples A and B. The low refractive index layer CE-1 was used as the initial low haze, low index coating on PET and this coated film became the substrate upon which the non-Low Index diffuser was coated to make the bilayer construction CE-2. The low haze, low index layer used in CE-2 was prepared using the same coating apparatus as described for Examples A and B. The 10 wt % coating solution CE-1A was coated on primed PET at a coating width of 45.7 cm (18 in) using a 89 micron (3.5 mil) bar gap. The 10 wt % solution was fed to the knife bar at a temperature of 37-42 C and coated at a rate of 4.57 m/min (15 fpm). These conditions produced a dried coating thickness of 13 microns (0.51 mil). The RI was determined to be 1.171 and transmission, haze and clarity values were determined to be 93%, 3% and 100% respectively. The coatings just described were then over coated with a diffuser layer described below.

The diffuser layer coating solution was prepared from a mixture of ethylene vinyl acetate copolymer dispersion (available as Vinnapas™ 192 from Wacker Chemie, GmbH, Burghausen, Germany). The EVA dispersion was mixed with 3 um crosslinked polystyrene beads available as KSR 3A from Soken Chemical and Engineering Co. Ltd. Sayama-Shi, Saitama-Ken, Japan. The components were mixed at a weight ratio of 60 wt % EVA-192 and 40 wt % KSR-3A. In a typical mix procedure 750 g of DI water and 250 g of IPA were charged to an appropriately sized mix vessel equipped with an air driven, high shear, dual stage paint mixer. With the agitator set on low speed, 340 g of Soken KSR 3A beads were charged and stirred until a homogenous, low viscosity dispersion was obtained. 31 g of a 10 wt % Tergitol™ Min Foam 1x surfactant solution in water (available from Dow Chemical of Midland, Mich.) was added followed by the addition of 1000 g Vinnapas™ 192 (51% solids). During this addition the mixture became more viscous and the agitation rate was increased to maintain a consistent agitation rate and ensure through mixing. The mixture was diluted further with 775 g of DI water and 255 g of isopropanol. This produced a final diffuser coating mixture of 3400 g at 25% solids.

This mixture was coated using the same coating apparatus as described for Examples A and B. However in this case, the knife bar gap was set to 25.4 microns (1 mil). The RI of the low index side of the film was 1.171. The RI data for the diffuser side of the film showed a very broad transition around 1.47-1.49. The transmission, haze and clarity values were found to be 92%, 98% and 4% respectively.

The axial luminance (cd/m2), integrated intensity (lm/m2), and half brightness angle (degrees) of the optical construction were measured using a Schott-Fostec-DCR light source (available from Schott-Fostec LLC, Auburn N.Y.) for illuminating the reference optical construction from the diffuser side, and an Autronic Conoscope Conostage 3 (available from Autronic-Melchers GmbH, Karlsruhe, Germany) for collecting the data from the linear polarizer side.

Optical Film Construction Example A

A control stack was prepared by placing a linear absorbing polarizer on the substrate side of 3B. The samples were not optically coupled. The optical properties were measured and are summarized in Table 4.

Optical Film Construction Example B

An optical construction was prepared by laminating the substrate side of 3B to a reflective polarizer (available as DBEF-Q from 3M Company, St. Paul, Minn.) via an optically clear adhesive (available as OCA 8171 from 3M Company, St. Paul, Minn.). Next, the other side of the reflective polarizer was laminated to a linear absorbing polarizer (available as SR5618 from San Ritz Corporation, Tokyo, Japan). The optical characteristics of the laminated stack were characterized and are summarized in Table 4.

Optical Film Construction Example C

A control stack was prepared by placing a linear absorbing polarizer on the substrate side of CE-2. The samples were not optically coupled. The optical properties were measured and are summarized in Table 4.

Optical Film Construction Example D

An optical construction was prepared by laminating the substrate side of CE-2 to a reflective polarizer (available as DBEF-Q from 3M Company, St. Paul, Minn.) via an optically clear adhesive (available as OCA 8171 from 3M Company, St. Paul, Minn.). Next, the other side of the reflective polarizer was laminated to a linear absorbing polarizer (available as SR5618 from San Ritz Corporation, Tokyo, Japan). The optical characteristics of the laminated stack were characterized and are summarized in Table 4.

The data in Table 4, show the single layer, high haze low refractive index coating can exhibit similar axial luminance and integrated intensity compared to a multiple layer construction.

Thus, embodiments of the OPTICALLY DIFFUSE LOW REFRACTIVE INDEX ELEMENT are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. An optical article comprising:
   an optical element;
   a low refractive index layer disposed on the optical element, the low refractive index layer having an effective refractive index of 1.3 or less, the low refractive index layer comprising: a binder; a plurality of metal oxide particles dispersed in the binder; and a plurality of interconnected voids, the low refractive index layer having a haze value of at least 30%, wherein the low refractive index layer has a thickness in a range from 1 to 20 micrometers.

2. An optical article according to claim 1, wherein the haze value is at least 50%.

3. An optical article according to claim 1, wherein the haze value is at least 90%.

4. An optical article according to claim 1, wherein the optical element is a polarizer.

5. An optical article according to claim 1, wherein the optical element is a visible light transmissive substrate.

6. An optical article according to claim 1, wherein the plurality of metal oxide particles comprises fumed silica.

7. An optical article according to claim 1, wherein the low refractive index layer has an effective refractive index of 1.23 or less when the plurality of metal oxide particles comprise silica and 1.33 or less when the plurality of metal oxide particles comprise alumina oxide.

8. An optical article according to claim 1, wherein a weight ratio of the binder to the plurality of metal oxide particles is 1:2 to 1:10.

9. An optical article according to claim 1, wherein the low refractive index layer has a clarity of less than 20%.

TABLE 4

Summary of measured optical properties for the single layer Coated Film 3B and bilayer coated film CE-2.

| Example | Film Construction | Axial Luminance (cd/m2) | Axial Luminance (cd/m2) | Integrated Intensity (lm/m2) | Integrated Intensity (lm/m2) | Half Brightness Angle Left | Half Brightness Angle Right |
|---|---|---|---|---|---|---|---|
| A-one coating | 3B-Not Optically coupled | 376 | 100% | 377 | 100% | 63 | 62 |
| B-one coating | 3B-Optically coupled | 538 | 143% | 539 | 143% | 72 | 72 |
| C-two coatings | CE-2-Not Optically coupled | 421 | 100% | 422 | 100% | 62 | 61 |
| D-two coatings | CE-2 Optically coupled | 599 | 142% | 600 | 142% | 72 | 71 |

10. An optical article according to claim 1, wherein the optical element is a polarizing film, a diffusing film, a partially reflecting film, a retarder, a light guide or a liquid crystal display panel.

11. An optical article comprising:
  a low haze optical low refractive index layer having an effective refractive index of 1.3 or less, the low haze low refractive index layer comprising: a binder; a plurality of metal oxide particles dispersed in the binder; and a plurality of interconnected voids, the low haze low refractive index layer having a haze value of less than 30%;
  a high haze low refractive index layer on the low haze optical low refractive index layer, the high haze low refractive index layer having an effective refractive index of 1.3 or less, the high haze low refractive index layer comprising: a binder; a plurality of metal oxide particles dispersed in the binder; and a plurality of interconnected voids, the high haze low refractive index layer having a haze value of at least 30%, wherein one or both of the low haze low refractive index layer and the high haze low refractive index layer has a thickness in a range from 1 to 20 micrometers.

12. An optical article according to claim 11, wherein the optical article has a haze value of at least 50%.

13. An optical article according to claim 11, wherein optical article has a haze value of at least 90%.

14. An optical article according to claim 11, further comprising a polarizer element disposed adjacent to the low haze low refractive index layer or high haze low refractive index layer.

15. An optical article according to claim 11, wherein the plurality of metal oxide particles that form the low haze low refractive index layer or high haze low refractive index layer comprises fumed silica.

16. An optical article according to claim 11, wherein the low haze low refractive index layer or high haze low refractive index layer has an effective refractive index of 1.23 or less.

17. An optical article according to claim 11, wherein a weight ratio of the binder to the plurality of metal oxide particles is 1:2 to 1:10 for both the low haze low refractive index layer and the high haze low refractive index layer.

18. An optical article according to claim 11, wherein the low haze low refractive index layer has a haze value of 10% or less and the high haze low refractive index layer has a haze value of 90% or greater.

19. An optical article according to claim 11, wherein the optical article has a clarity of less than 20%.

* * * * *

UNITED STATES PATENT AND TRADEMARK OFFICE
CERTIFICATE OF CORRECTION

PATENT NO.        : 9,588,262 B2
APPLICATION NO.   : 13/879839
DATED             : March 7, 2017
INVENTOR(S)       : William D. Coggio It is certified that error appears in the above-identified patent and that said Letters Patent is hereby corrected as shown below:

In the Specification

Column 3,
Line 8, delete "intergrated" and insert -- integrated -- therefor.

Column 4,
Line 14, delete "$\varepsilon_{eff} = f\, \varepsilon_v (1-f)\, \varepsilon_b$" and insert -- $\varepsilon_{eff} = f\, \varepsilon_v + (1-f)\, \varepsilon_b$ -- therefor.
Line 62, delete "vinly" and insert -- vinyl -- therefor.
Line 66, delete "2-butone" and insert -- 2-butanone -- therefor.

Column 5,
Line 11, delete "triacryalate" and insert -- triacrylate -- therefor.
Line 32, delete "(epichlorhydrin)amide" and insert -- (epichlorohydrin)amide -- therefor.
Line 46, after "alumina" insert -- . --.
Line 58, after "alumina" insert -- . --.

Column 6,
Line 33, delete "isocynanate" and insert -- isocyanate -- therefor.

Column 7,
Line 11, delete "Intersceince" and insert -- Interscience -- therefor.
Line 48, delete "Braunauer" and insert -- Brunauer -- therefor.

Column 9,
Line 63, delete "Grauvre" and insert -- Gravure -- therefor.

Column 13,
Line 40, delete "Terrytown" and insert -- Tarrytown -- therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*

Column 17,
Line 49, delete "Meisner" and insert -- Meissner -- therefor.

Column 18,
Line 18, delete "Meisner" and insert -- Meissner -- therefor.
Line 22, delete "mi1)." and insert -- mil). -- therefor.